US010165762B2

(12) United States Patent
Hughes

(10) Patent No.: US 10,165,762 B2
(45) Date of Patent: Jan. 1, 2019

(54) TEMPERATURE CONTROLLED CONTAINERS

(75) Inventor: Kenneth D. Hughes, Alpharetta, GA (US)

(73) Assignee: Kenneth D. Hughes, Alpharetta, GA (US)

( * ) Notice: Subject to any disclaimer, the term of this patent is extended or adjusted under 35 U.S.C. 154(b) by 0 days.

(21) Appl. No.: 12/702,150

(22) Filed: Feb. 8, 2010

(65) Prior Publication Data

US 2010/0218728 A1   Sep. 2, 2010

Related U.S. Application Data

(63) Continuation of application No. 11/800,176, filed on May 5, 2007, now abandoned.

(51) Int. Cl.
*A01K 63/06* (2006.01)
(52) U.S. Cl.
CPC .................................. *A01K 63/065* (2013.01)
(58) Field of Classification Search
CPC ....................................................... A01K 63/065
USPC .............. 119/220, 229, 248; 219/449.1, 432
See application file for complete search history.

(56) References Cited

U.S. PATENT DOCUMENTS

| 1,745,534 | A | * | 2/1930 | Grayson | 219/478 |
| 2,002,380 | A | * | 5/1935 | Wernicke et al. | 47/69 |
| 3,890,486 | A | * | 6/1975 | Fitzgerald | 219/523 |
| 4,313,048 | A | * | 1/1982 | Holbrook | 392/444 |
| 4,481,408 | A | * | 11/1984 | Scheufler | 219/432 |
| 4,523,083 | A | * | 6/1985 | Hamilton | 219/433 |
| 4,839,498 | A | * | 6/1989 | Chak | 392/444 |
| 5,248,870 | A | * | 9/1993 | Redal | 219/521 |
| 6,444,956 | B1 | * | 9/2002 | Witcher et al. | 219/429 |
| 7,041,942 | B2 | * | 5/2006 | Gerhardinger | 219/450.1 |
| 2003/0159346 | A1 | * | 8/2003 | Jung | 47/41.01 |
| 2008/0053376 | A1 | * | 3/2008 | Marks | 119/248 |

FOREIGN PATENT DOCUMENTS

BE          1007644 A6 *  8/1995  .......... A01K 63/065

* cited by examiner

*Primary Examiner* — Brian M O'Hara
(74) *Attorney, Agent, or Firm* — F. Brent Nix, Esq.; Johnson, Marcou & Isaacs, LLC

(57) ABSTRACT

Devices and methods are disclosed for the housing and maintenance of aquatic, semi-aquatic, and terrestrial organisms. Methods and device can be applied widely in the care and culture of these species and will find wide applicability in the aquaculture industry, aquarium and pet hobby, science instruction and education, environmental screening and toxicity testing, and the education-entertainment field.

20 Claims, 9 Drawing Sheets

TEMPERATURE CONTROLLED CONTAINERS

PRIORITY AND RELATED APPLICATIONS

The present application is a continuation of and claims priority under 35 U.S.C. § 120 to U.S. application Ser. No. 11/800,176 filed May 5, 2007, now abandoned entitled "Temperature Controlled Containers". The entire disclosure of this prior application is hereby fully incorporated by reference in the present application.

FIELD OF THE INVENTION

The herein disclosed invention is directed at methods and devices for the maintenance of living organisms in a temperature controlled container. Devices and methods are applicable to a wide variety of aquatic, semi-aquatic, and terrestrial plants and animals. Devices and methods can be used to create containers ideally suited for warm climate organisms, including labyrinth fish and in particular those known as *Betta* fish.

BACKGROUND OF THE INVENTION

Aquariums and terrariums are used to house a wide variety of living aquatic and terrestrial animals and plants. These housings can be fabricated with many different types of materials and in many shapes and sizes. Successful maintenance of organisms in these housings often requires simulating the characteristics of the organism's natural environment. One of the most important physical characteristics to accurately reproduce is temperature.

Aquariums and terrariums are usually placed in locations where ambient temperatures constantly vary between 68° F. and 78° F. throughout the day. This temperature range is maintained both for the comfort and work efficiency of human occupants and to control energy costs. In many cases, temperature fluctuations in these locations often exceed the full temperature range as room heating and cooling equipment cycle on and off. It is well known that large temperature fluctuations are detrimental to the health and well being of many organisms housed in aquariums and terrariums. As a result, heating and cooling equipment are frequently added to aquariums and to some extent terrariums in order to modify and maintain temperatures more appropriate for the inhabitants.

Common temperature control equipment for aquariums and terrariums include resistive and radiative heaters, chillers utilizing compressors and thermoelectric technologies, and associated thermostats, sensors, and switching circuits. The volume of the aquarium or terrarium and ambient temperature characteristics dictate the sophistication, complexity, and capacity of the equipment required for successful temperature control. Thermostats and temperature sensing electronics which cycle heaters and coolers on and off are critical components of temperature control systems. The more accurate and precise the temperature control requirements the more sophisticated the thermostat and switching technology. Typically, increased sophistication results in substantially increased equipment costs.

It is common to control aquarium water temperature by submersing one or more self-contained combination heater-thermostat devices. Temperature control may also be accomplished by utilizing more sophisticated systems involving the submersion of a temperature probe which communicates with an external control unit in contact with aquarium water. In each of these methods the aquarium water makes direct contact with the heating or cooling element. As a result, heating and cooling elements must be inert to protect inhabitants and water tight to protect electronic components from malfunction. Unfortunately, this equipment often is difficult to troubleshoot and must be replaced frequently to guarantee safety to inhabitants.

Terrariums are often heated with electrical elements buried in the substrate materials inside the terrarium, electrical objects constructed to look like rocks and other natural materials, and through the use of long wave-length radiation emitters positioned outside the terrarium, or a combination thereof.

Small volume aquariums and terrariums present unique difficulties for heating and cooling equipment, as common malfunctions in thermostat and switches can rapidly push temperatures into lethal ranges. Addressing these problems is usually not economical. Additionally, as aquarium and terrarium volume is decreased, heating and cooling equipment and associated electrical cords and components require a greater percentage of container volume which decreases available space for inhabitants, are difficult to hide from view, and significantly decreases the aesthetic characteristics of the aquarium or terrarium.

Therefore, there is a need for simple, convenient, and aesthetically pleasing methods and devices, for controlling the temperature of small and medium sized aquaria and terraria.

SUMMARY OF THE INVENTION

The instant invention involves the creation of temperature controlled devices, consisting of a container suitable for creating an aquarium or terrarium, and a support structure for the container, which incorporates the temperature control equipment. Devices of the invention allow optimization of temperature for captive inhabitants in situations where ambient temperatures are maintained for human comfort. Device containers facilitate the preparation of suitable habitats for living organisms including appropriate substrate materials and natural or synthetic objects used to provide shelters, hiding places, and the like.

The container support participates in the temperature control of the container and associated contents including live plant and animal species. Temperature control incorporated into the support structure includes widely available heating and cooling elements and associated electrical thermostat and switching components. Those experienced in the art will understand that the identity and thermal characteristics of materials used to fabricate both container and container support will affect device temperature and variations in the temperature of both components. Those experienced in the art will also understand that contact characteristics between container and container support structures are important and affect temperature of both components. Container support structures can be designed into a wide range of aesthetic shapes and sizes. Preferred container support structure designs include those commonly available as stands and bases supporting vases, figurines, glass objects, candles, and decorative art on countertops and pedestals, as well as those stands and bases which are used to construct lamps.

Container support structures associated with devices of the invention incorporate all electronic components associated with controlling temperature in the container. As a result, there are no electrical devices, temperature probes, or associated wires placed inside the container or mounted on the outside surface of the container, which would obstruct viewing of container inhabitants, decrease container volume for inhabitants, or decrease the aesthetic appeal of the system.

Exemplary devices include those where container and container support structure are permanently secured together, devices where container and container support structure are easily separated, and devices where container and container support structure incorporate inter-locking elements which create intimate but reversible connections.

Devices of the invention are suitable for housing and maintaining aquatic, semi-aquatic, and terrestrial, animals such as fish, reptiles, amphibians, insects, and other small animals. Devices of the invention are suitable for a wide range of plant species including aquatic, semi-aquatic, bog, and desert species. Exemplary animals include labyrinth fish such as *Betta* fish which require temperatures well above that enjoyed by humans. Specifically, *Betta splendens* fish are well suited for inclusion in devices of the invention.

Exemplary devices of the invention incorporate thermostats for switching temperature equipment on and off, wire based resistive heating elements including those based on nichrome or other metal alloy wires, ceramic-plate heating elements, printed heating sheets and foils, thermoelectric devices, heat conductors, fans, indicator lights and sound generators, visual temperature indicators, switches, and timers.

Devices of the invention may incorporate containers in common shapes such as bowls, vases, squares, rectangles, cones, cubes, and other geometric shapes. Container volumes can be varied widely. Container wall thickness may also be varied widely. Devices of the invention may incorporate containers constructed of different materials including glass, plastics, metals, ceramics, and combinations thereof. A preferred shape is that of vases which have volumes greater than 2 liters.

Devices of the invention may incorporate container support structures in a wide variety of shapes, sizes, and designs. Exemplary designs include those which are frequently used to create bases, stands, and supports for artifacts, sculptures, vases, ornaments, and statues. Exemplary designs include those which are frequently used to create bases, stands, and supports for lamps and lighting fixtures. Container support structures designed with traditional Asian elements are preferred designs.

Container support structures incorporated into devices of the invention can be constructed from a wide range of materials including natural materials such as wood, plastics, wood composites, resin composites, minerals, metals, and combinations thereof. Preferred materials include woods, plastics, and composites of wood and resin, medium density fiberboard, composite wood, and composites generated through pressurization. Preferred materials include those with good heat transfer characteristics between heating elements and containers.

The utility of the instant invention is far reaching and provides significant benefits that have not been previously described in the field of small aquarium and terrarium design and fabrication.

It is therefore an object of this invention to provide temperature controlled aquaria for housing living organisms for application in commercial, scientific, and residential situations. It is also an object of this invention to provide temperature controlled terraria for housing living organisms for application in commercial, scientific, and residential fields.

DETAILED DISCUSSION

Figure 1:
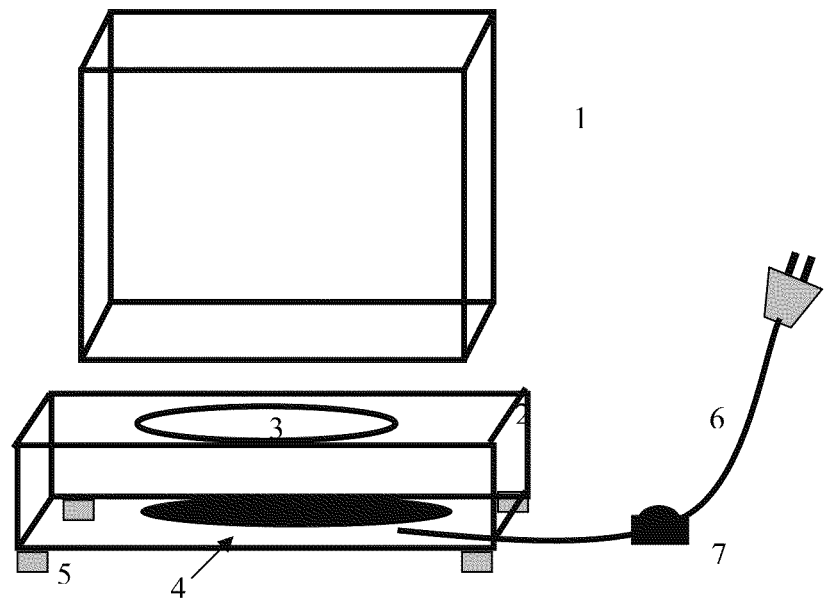
FIG. 1, a front view, illustrates one embodiment of the invention, a device made from a square or rectangular shaped container and corresponding support structure which incorporates temperature control equipment.

The instant invention involves the creation of temperature controlled devices, consisting of a container suitable for creating an aquarium or terrarium, and a container support structure, which incorporates the temperature control equipment. Thermal transfer between container and container support allows the system temperature to be controlled. Devices of the invention allow optimization of temperature for captive inhabitants in situations where ambient temperatures are maintained for human comfort. Device containers facilitate the preparation of suitable habitats for living organisms including appropriate substrate materials, and natural or synthetic objects used to provide shelters, hiding places, and the like.

Devices of the invention provide significant utility in the creation of aquaria and terraria. The first part of the device, the container, contains living aquatic, semi-aquatic, or terrestrial organisms. The second part of the device, a container support structure, incorporates the temperature control equipment for control and manipulation of temperature in the aquaria and terraria.

Methods and devices of the invention allow aesthetically pleasing as well as functional aquaria and terraria to be created and placed in a wide variety of different temperature rooms, and residences, businesses, and industrial environments, where temperatures are not appropriate for inhabitants of the aquaria and terraria. Preferred devices incorporate transparent containers fabricated with materials that are compatible for housing living organisms, and which are water tight. Preferred container support structures incorporated into devices of the invention, facilitate the concealed mounting of heating and cooling equipment and allow intimate contact with containers for heat transfer. Preferred device components are stable to temperatures ranges common for tropical organisms.

Applications and General Embodiments:

Devices and methods of the invention provide simple, convenient, and aesthetically pleasing temperature controlled environments for living organisms. Devices and methods of the invention eliminate the need to submerse or bury electrical heating and cooling equipment which increases the hazards to both aquaria or terraria caretakers and inhabitants and significantly decreases the aesthetics of small volume systems.

The disclosed invention facilitates the creation of a wide variety of desirable decorative designs to be implemented. These include containers of different size and shape and material composition and container support structures with different material compositions, designs, and shapes. Broad design flexibility expands the locations and decors where aquaria and terraria may be placed.

General embodiments include use of devices to house aquatic animals and plants. General embodiments include use of devices to house small terrestrial animals and plants. General embodiments include devices for culturing, hatching, propagating, and breeding both aquatic and terrestrial organisms.

General embodiments involve the fabrication of devices for the field of aquaculture, the aquarium hobby, the care and maintenance of aquatic and semi-aquatic organisms, science education, and for commercial display purposes.

General embodiments include devices which allow one or more temperatures to be set manually. General embodiments include devices that do not incorporate thermostats and increase temperatures by fixed amounts above ambient. General embodiments include devices which are useful as small volume aquaria and terraria. General embodiments include devices which contain thermostats for automated fixed temperature control.

General embodiments include use of glass or plastic containers mated with plastic molded support structures with integrated resistive heating elements, use of glass or plastic containers mated with wood support structures with integrated resistive heating elements, use of glass or plastic containers mated with wood composite support structures with integrated resistive heating elements, use of glass or plastic containers mated with metal supports with integrated temperature control elements and use of glass or plastic containers mated with metal composite support structures with integrated temperature control elements. General embodiments include use of glass or plastic containers mated with stone support structures with integrated resistive heating elements, and use of glass or plastic containers mated with stone composite support structures with integrated resistive heating elements.

Beneficial Characteristics of the Invention:

Devices and methods of the invention greatly increase the success of maintaining organisms that live and thrive in temperature ranges outside those common maintained in residences, businesses, office buildings, and industrial settings. Additionally, temporary placement of devices outdoors is anticipated especially for social events. Devices of the invention provide a simple and convenient method of controlling temperature in a wide range of transparent and opaque containers which have been traditionally used to house both animals and plants obtained from aquatic and terrestrial locations.

Isolating temperature control equipment outside the container housing organisms simplifies design and manufacture of electronic heating components, avoids the need for water tight electronic housings, and increases safety to both inhabitants and caretakers. Further, device caretakers are not required to place hands or other implements inside the container to position, move, and maintain temperature equipment. This avoids introduction of contaminants and disruption of habitat. Furthermore, eliminating temperature control equipment from the inside or outside surface of the container housing the organisms greatly enhances the aesthetics of the aquarium or terrarium.

Devices of the invention heat or cool the bottom of containers and as a result generate temperature gradients in containers. These gradients allow low density objects such as food materials, as example, brine shrimp and detritus to move between container top and bottom when water is present. Additionally, temperature gradients provide a more natural environment for many organisms.

Increased simplicity and convenience allows aquatic organisms to be housed and propagated by a wider variety of non-experienced individuals and in a greater number of locations and situations.

Preparation of Devices of the Invention:

There are many methods of practicing the disclosed invention. In general, devices such as aquaria and terraria, are created with two components. These two components may ultimately be permanently connected, temporarily connected, or a combination thereof, using a wide variety of inter-locking mechanisms. Those experienced in the art will understand the wide variety of inter-locking designs that are suitable for the described application.

The first part, a container, is used to house the organisms. Exemplary containers are prepared with transparent or opaque materials including plastics, ceramics, metals, glass, composites, and combinations thereof. Preferred materials are transparent, water tight, and light weight. Preferred materials include glass, acrylic, polycarbonate, polystyrene, and polymer composites.

Exemplary shapes include bowls, squares, rectangles, other geometric shapes created as single structures or fabricated with flat panels or sheets and appropriate adhesives. Exemplary shapes include cones, and vases with varying proportions. A preferred shape is a vase which has a bottom dimension of 4 inches, a top dimension of 4 inches, and a mid-dimension of 8 inches, with a total height of 13 inches. This container holds between 1.5 and 2 gallons of water and provides several advantages for creating aquaria. These include, the minimization of "floor" space which allows easy removal of detritus, and use of a minimal amount of substrate, as well as the ability to easily insert hands for cleaning. Exemplary container materials can be cleaned and sanitized with a range of common household chemicals including chlorine and oxygen based cleaners. Dishwasher safe materials are preferred.

The second part, a container support structure, is used to support the container housing the organisms. Exemplary support structures are prepared with materials including plastics, ceramics, metals, metal composites, wood, wood composites, and combinations thereof. Preferred materials are opaque, and provide concealed, or semi-concealed mounting of temperature control electronics. Preferred materials include, acrylic, polycarbonate, polystyrene, and polymer composites, wood, wood composites, wood fiber boards, MDF and related composites, laminates and composites, metal, metal composites, and combinations thereof. Preferred support structures also include laminated designs which allow inexpensive materials to be used for the bulk of the structure and wood or simulated grain materials to be used on the outer surface for aesthetic appeal. Preferred wood composites include those known as medium density fiberboard.

Exemplary container support structure designs include structures with two or more legs for positioning container support structures on countertops, furniture, and floors. This type of positioning allows temperature control electronics to be concealed underneath or inside the support structure.

Exemplary materials used to prepare devices of the invention include, thermoplastic elastomers such as polystyrene-dienes, polyurethanes, copolyester-ethers; PVDC, OPP, nylon, EVA, EAA, EMA, LLDPE, VLDPE, ULDPE, PP, PCTFE, ECTFE, PET/PETG, as well as laminates and blends of materials including Bynel, Crystar, Dartek, Elvaloy, Delrin, polyethers of formaldehyde/ethylenoxide, polyethylene, polystyrenes, polyvinyl chlorides, ionomers, polyethylene terephthalates, polyvinyl acetates, polycarbonates, polyamides, polyvinylidene chlorides, ethylene acrylate copolymers including butyl-, ethyl- and methyl-acrylates (EBAs, EEAs and EMAs), nylons, polypropylenes, polybutadienes and polyisoprenes, polyvinylchorides, propanediols, fluorinated polymers including Teflon, and polyesters. Exemplary materials include phenolic resins, polypropylene, LD polyethylene, MD polyethylene, HD polyethylene, polyvinyl chloride, polyethylene terephthalate, glycol modified polyethylene terephthalate, polycarbonate, cyclo-olefin copolymer, nylon 6, polyethylene naphthalate, and polystyrene. Those experienced in the art will understand the temperature characteristics of these materials, and composites and how to suitably prepare these materials for use in the invention.

Exemplary designs include those commonly used to prepare lamp bases or stands, stands for displaying artifacts, Asian art, vases, sculptures, figurines, and the like. Exemplary designs are illustrated in FIGS. 7-9.

Exemplary temperature control equipment includes resistive heating wires and cables. Preferred wires include nichrome and other metal alloys of different resistances, lengths, and windings. Exemplary wire systems include resistive wire systems including mineral, polymer, and textile sheathing combinations. Exemplary heating devices include non-resistive wire based elements based on dielectric and ceramic piece designs in combination with "electrode structures". Preferred heating elements include nichrome wire systems which can be combined with current control electronics such as diodes, standard inline lamp switches and dimmer systems. Additional exemplary electronic equipment includes thermostats, capacitors, resistors, and associated wiring components. Exemplary heating equipment includes heat sinks, fans and thermal distribution designs which allow transfer of heat between spatial locations. Exemplary cooling devices include thermoelectric and Peltier cooling components.

Those experienced in the field will understand that temperature control systems can be designed for a very wide range of heating and cooling capacities and that aligning heating and cooling capacity with aquarium or terrarium volume is critical for successful temperature control. Further, those experienced in the field will understand the advantages and disadvantages of using alternating current and direct current components in conditioning electrical power, voltage and current for temperature control. Furthermore, the design and incorporation of thermostats and other temperature sensors provide feedback for controlling temperature. Heating elements can be rigid or flexible and vary widely in shape, thickness, size, and power capacity. Preferred resistive heating elements are designed to make intimate contact with container support materials. Preferred thermal elements include metal plates which contain heating elements and allow heat to be distributed across larger areas. Preferred heating elements use a "sandwich" design where the resistive element is sandwiched between two metal or heat conducting plates. Resistive thermal elements can be bolted or pressure fit into or onto support structures. Heating and cooling elements can be used individual or in arrays of multiple units. Further, several different heating and cooling elements each with different power levels can be used in the same support structure in order to allow the operator to switch between different temperatures and ultimately select different organisms for the container.

Mounting of temperature control equipment to the container support can be accomplished with temperature appropriate adhesives, straps, screws, nuts and bolts, and the like. Preferred adhesives include silicones and cyanoacrylates. Preferred mounting hardware include screws, nuts, and bolts made of plastic or metal.

While not wishing to be bound by any theory, it is believed that device temperature control includes transfer of heat between device container and device container support structure through both intimate contact between support structure and container and exposure to temperature modified air existing in between device components and or near the system. Those expert in the field will also understand that heat transfer between heating or cooling elements and the container support structure impacts container temperature.

Additionally, those expert in the field will understand that the distance between the container support structure, which contains heating and cooling elements, and a table or counter-top will impact the container and device temperature. Likewise, thermal characteristics of the table or counter-top on which the container support structure, which incorporates a heating or cooling element, sits will impact the temperature of both container and container support.

Further, heat capacity characteristics of all materials and objects placed inside the container or in the vicinity of the container impact both the temperature of the device and the variances in temperatures realized by the device.

Those expert in the field will also understand that placing a lid on the container will increase the temperature of the container and its contents in a manner reflected by variables including lid tightness, design, hole size and spacing, and composition.

Devices of the invention function efficiently with simple lighting and illumination equipment. Standard equipment for providing lighting includes incandescent, metal halide, diode, halogen, and fluorescent sources. Those experienced in the art will understand the color spectrum and intensity differences between different light sources as well as the need for filtering unwanted frequencies. Experts in the field will understand the heat generation characteristics of light sources and the mechanisms for controlling temperature of illuminated devices. Further those expert in the field will understand that device temperature control equipment must take into account the heat generated by lighting systems.

DETAILED DESCRIPTION OF FIGURES

FIG. 1.

FIG. 1 illustrates one embodiment of the invention, a side view of a device prepared with a transparent rectangular container (1) which sits on a support structure (2) which is fabricated from a wood composite. The support structure contains a cut-out or hole (3) to improve heat transfer. A heating plate (4) containing resistive nichrome wire is mounted to the underside of support structure (2) using screws (not shown). Protective rubber feet (5) serve to elevate the support structure above a table or counter-top and protect the table or counter-top surface. The heat plate (4) is connected to a power cord (6) which includes a hi/lo/off power switch incorporating a diode which provides a high temperature setting, a low temperature setting, and an off setting.

FIG. 2.

Figure 2:
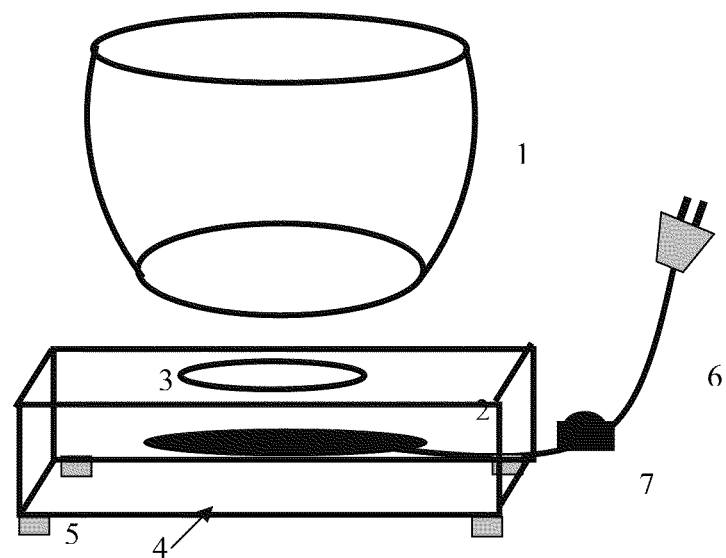
FIG. 2, a front view, illustrates one embodiment of the invention, a device made from a round shaped container and corresponding support structure which incorporates temperature control equipment.

FIG. 2 illustrates one embodiment of the invention, a side view of a device prepared with a transparent or opaque bowl-shaped container (1) which sits on a support structure (2) which is fabricated from a wood composite. The support structure contains a cut-out or hole (3) to improve heat transfer. A heating plate (4) containing nichrome resistive wire is mounted to the underside of support structure (2) using screws (not shown). Protective rubber feet (5) serve to elevate the support structure above a table or counter-top and protect the table or counter-top surface. The heat plate (4) is connected to a power cord (6) which includes a hi/lo/off power switch which provides a high temperature setting, a low temperature setting, and an off setting.

FIG. 3A

Figure 3:
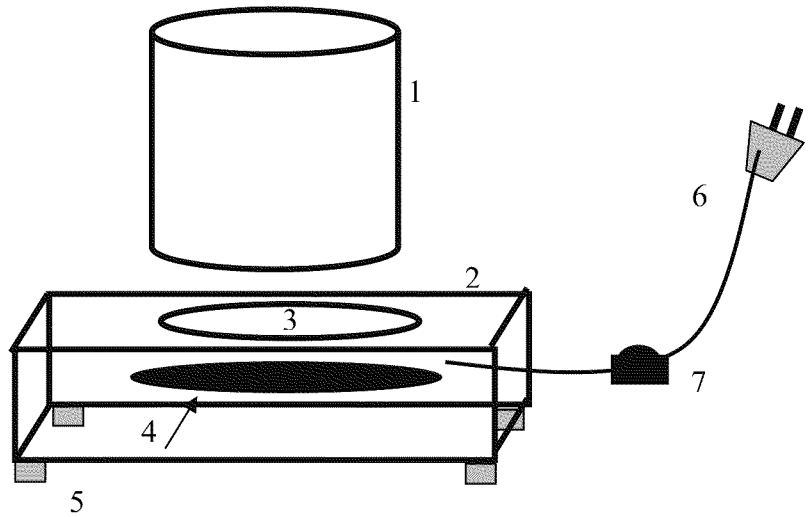
FIG. 3 a front view, illustrates one embodiment of the invention, a device made from a cylinder shaped container and corresponding support structure which incorporates temperature control equipment.

FIG. 3 illustrates one embodiment of the invention, a side view of a device prepared with a transparent cylinder container (1) which sits on a support structure (2) which is fabricated from a wood composite. The support structure contains a cut-out or hole (3) to improve heat transfer. A heating plate (4) containing resistive wire is mounted to the underside of support structure (2) using screws (not shown). Protective feet (5) serve to elevate the support structure above a table or counter-top and protect the table or counter-top surface. The heat plate (4) is connected to a power cord (6) which includes a hi/lo/off power switch which provides a high temperature setting, a low temperature setting, and an off setting.

FIG. 4.

Figure 4:
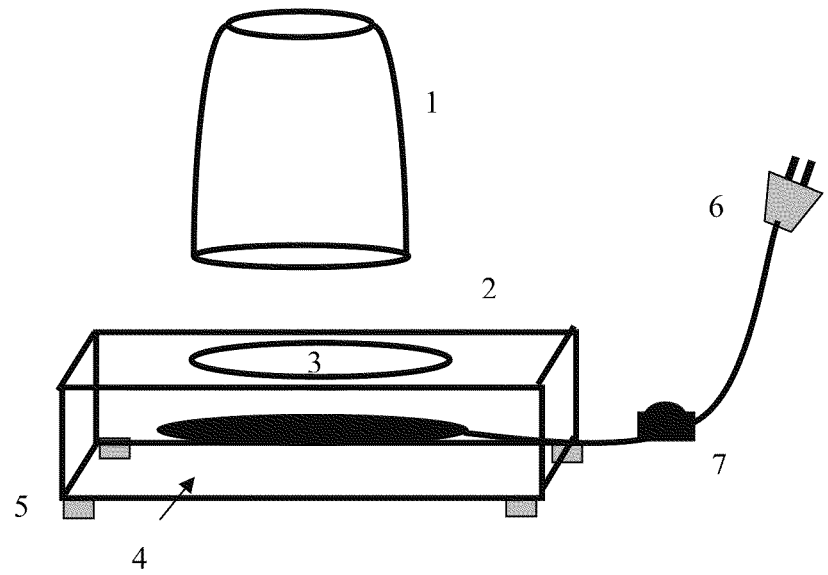
FIG. 4, a front view, illustrates one embodiment of the invention, a device made from a cone-shaped container and corresponding support structure which incorporates temperature control equipment.

FIG. 4 illustrates one embodiment of the invention, a side view of a device prepared with a transparent cone-shaped container (1) which sits on a support structure (2) which is fabricated from a wood composite. The support structure contains a cut-out or hole (3) to improve heat transfer. A heating plate (4) containing resistive wire is mounted to the underside of support structure (2) using screws (not shown). Protective feet (5) serve to elevate the support structure above a table or counter-top and protect the table or counter-top surface. The heat plate (4) is connected to a power cord (6) which includes a hi/lo/off power switch which provides a high temperature setting, a low temperature setting, and an off setting.

FIG. 5.

Figure 5:
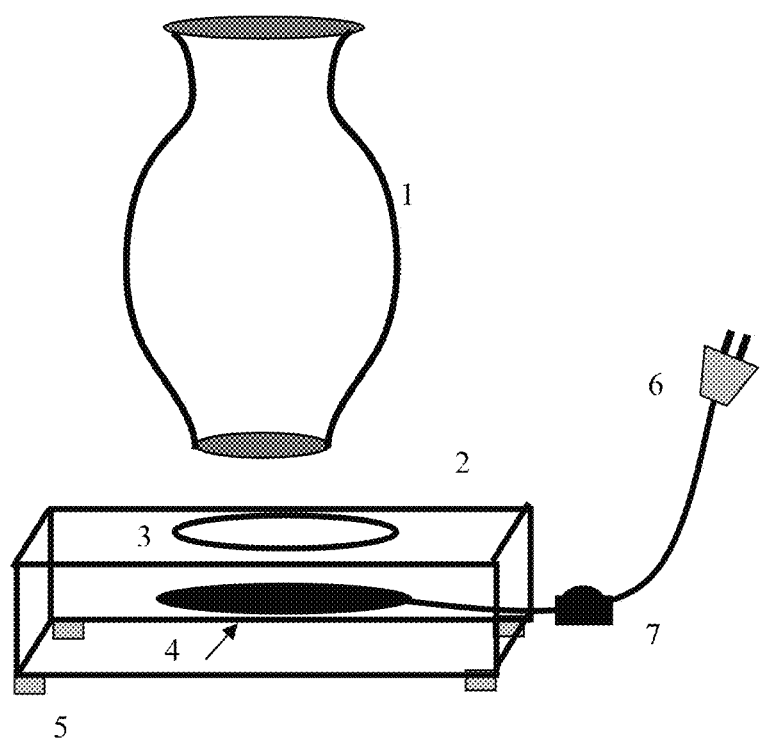
FIG. 5, a front view, illustrates one embodiment of the invention, a device made from vase-shaped container and corresponding support structure which incorporates temperature control equipment.

FIG. 5 illustrates one embodiment of the invention, a side view of a device prepared with a transparent vase-shaped container (1) which sits on a support structure (2) which is fabricated from a wood composite. The support structure contains a cut-out or hole (3) to improve heat transfer. A heating plate (4) containing nichrome resistive wire is mounted to the underside of support structure (2) using screws (not shown). Protective rubber feet (5) serve to elevate the support structure above a table or counter-top and protect the table or counter-top surface. The heat plate (4) is connected to a power cord (6) which includes a hi/lo/off power switch containing a diode which provides a high temperature setting, a low temperature setting, and an off setting.

FIG. 6.

Figure 6:
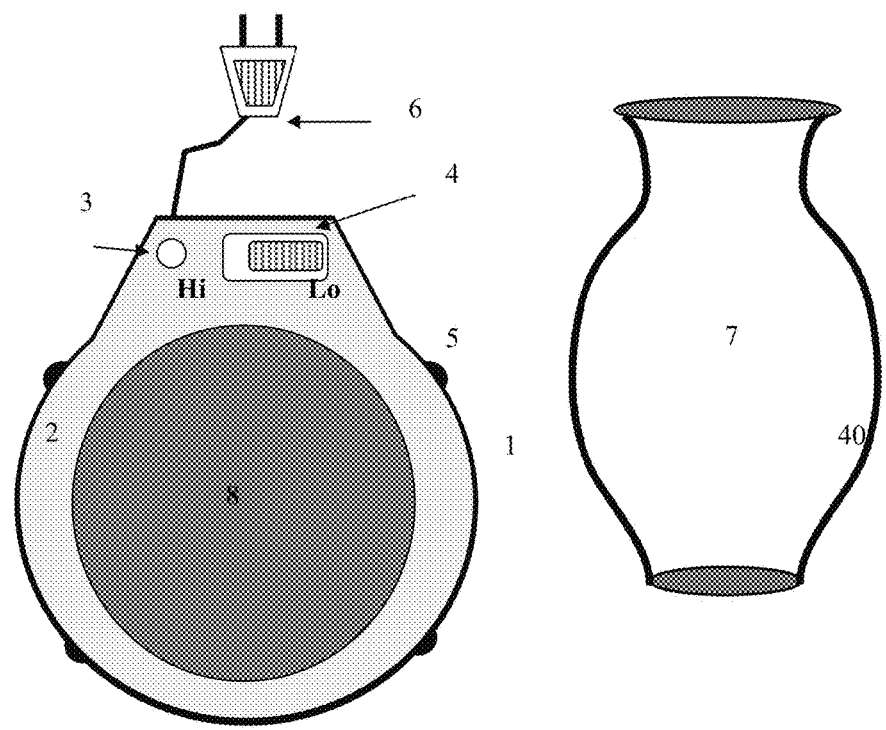
FIG. 6, a top view, illustrates one embodiment of the invention, a plastic container support structure which incorporates heating equipment such as a resistive heating plate, high-low temperature switch, and a power "on" visual indicator (light).

FIG. 6 illustrates one embodiment of the invention, a top view of a device prepared with a transparent vase-shaped container (7) which sits on a support structure (1) which is fabricated from a polymer material in two parts (top and bottom). The support structure contains a cut-out or hole (2) to improve heat transfer. A heating plate (8) containing resistive nichrome wire is pressure mounted between the top and bottom parts of the support structure (1) using screws (not shown). Protective rubber feet (5) serve to elevate the support structure above a table or counter-top and protect the table or counter-top surface. The heat plate (8) is connected to a small circuit board contained in the support structure and subsequently to a power cord (6). The support structure (1) contains an integrated hi/lo power switch (4) using a diode and corresponding indicator light (3).

FIG. 7A.

Figure 7A:
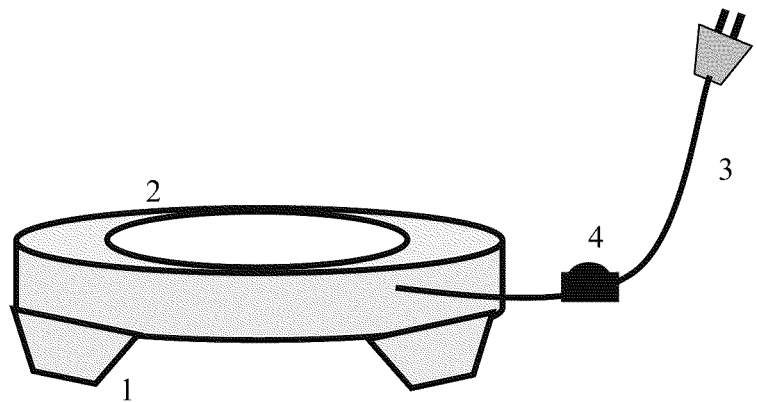
FIGS. 7A-D illustrate several different container support structure designs which incorporate temperature control equipment.

FIG. 7A illustrates one embodiment of the invention, a side view of a device support structure (1) which is fabricated from a wood composite in a traditional round Asian design for vase and figurine display. The support structure contains a cut-out or hole (2) to improve heat transfer. A heating plate (not shown) containing nichrome resistive wire is mounted to the underside of support structure (2) using screws (not shown). The heat plate is connected to a power cord (4) which includes a hi/lo/off power switch which provides a high temperature setting, a low temperature setting, and an off setting.

FIG. 7B.

Figure 7B:
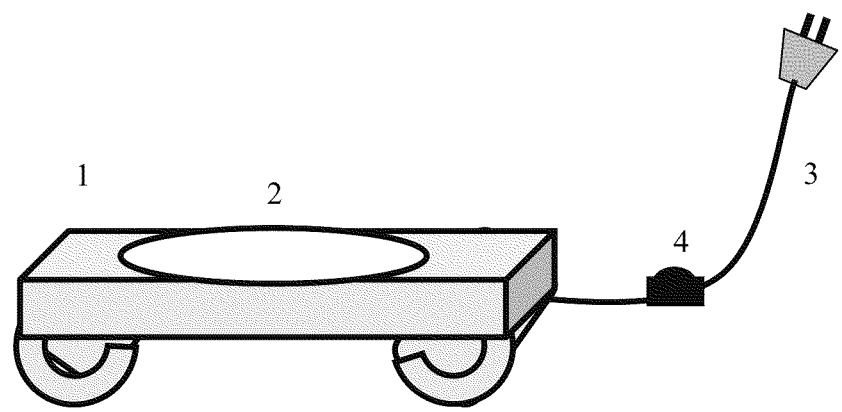

FIG. 7B illustrates one embodiment of the invention, a side view of a device support structure (1) which is fabricated from a wood composite in a traditional rectangle with scroll legs Asian design for vase and figurine display. The support structure contains a cut-out or hole (2) to improve heat transfer. A heating plate (not shown) containing resistive wire is mounted to the underside of support structure (2) using screws (not shown). The heat plate is connected to a power cord (4) which includes a hi/lo/off power switch which provides a high temperature setting, a low temperature setting, and an off setting.

FIG. 7C.

Figure 7C:
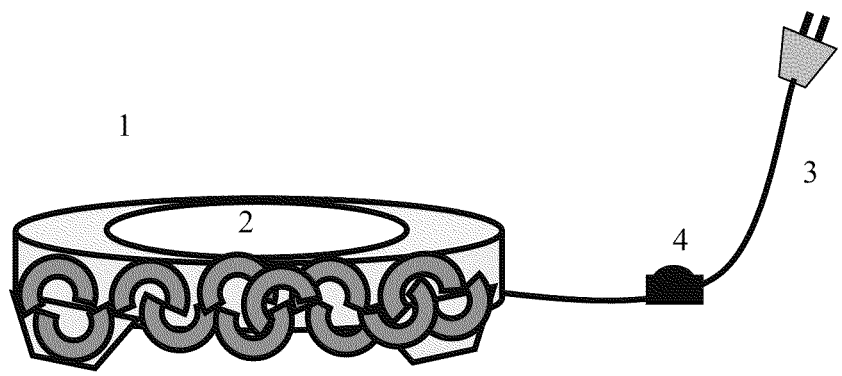

FIG. 7C illustrates one embodiment of the invention, a side view of a device support structure (1) which is fabricated from a wood composite in a traditional round with intricate carve-outs Asian design for vase and figurine display. The support structure contains a cut-out or hole (2) to improve heat transfer. A heating plate (not shown) containing resistive wire is mounted to the underside of support structure (2) using screws (not shown). The heat plate is connected to a power cord (4) which includes a hi/lo/off power switch which provides a high temperature setting, a low temperature setting, and an off setting.

FIG. 7D.

Figure 7D:
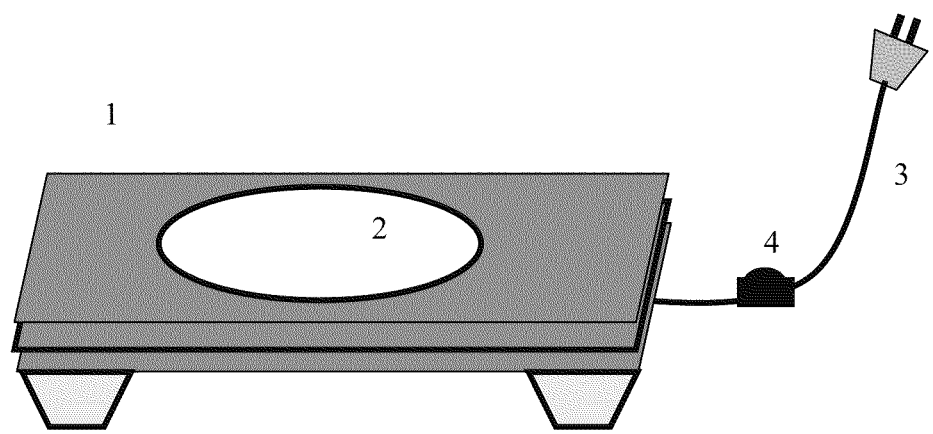

FIG. 7D illustrates one embodiment of the invention, a side view of a device support structure (1) which is fabricated from a wood composite in a traditional square Asian design for vase and figurine display. The support structure contains a cut-out or hole (2) to improve heat transfer. A heating plate (not shown) containing resistive wire is mounted to the underside of support structure (2) using screws (not shown). The heat plate is connected to a power cord (4) which includes a hi/lo/off power switch which provides a high temperature setting, a low temperature setting, and an off setting.

FIG. 8A.

Figure 8A:
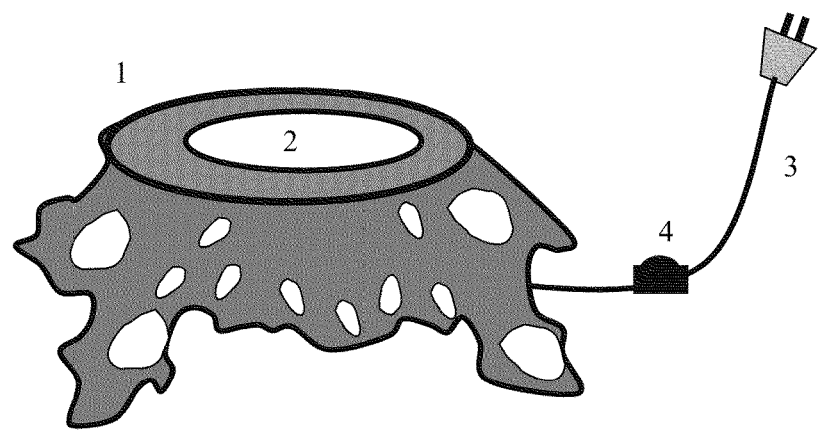
FIGS. 8A-B illustrate several different container support structure designs which incorporate temperature control equipment.

FIG. 8A illustrates one embodiment of the invention, a side view of a device support structure (1) which is fabricated from a wood composite in a traditional metal base for a lamp. The support structure contains a cut-out or hole (2) to improve heat transfer. A heating plate (not shown) containing resistive wire is mounted to the underside of support structure (2) using screws (not shown). The heat plate is connected to a power cord (4) which includes a hi/lo/off power switch which provides a high temperature setting, a low temperature setting, and an off setting.

FIG. 8B.

Figure 8B:
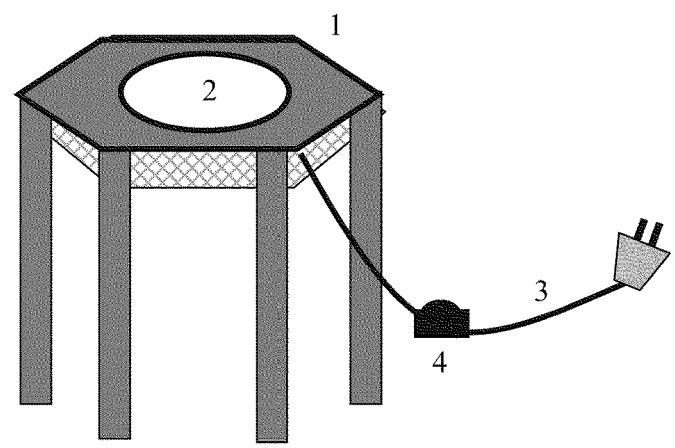

FIG. 8B illustrates one embodiment of the invention, a side view of a device support structure (1) which is fabricated from a wood composite in a traditional pedestal design. The support structure contains a cut-out or hole (2) to improve heat transfer. A heating plate (not shown) containing resistive wire is mounted to the underside of support structure (2) using screws (not shown). The heat plate is connected to a power cord (4) which includes a hi/lo/off power switch which provides a high temperature setting, a low temperature setting, and an off setting.

FIG. 9A.

Figure 9A:
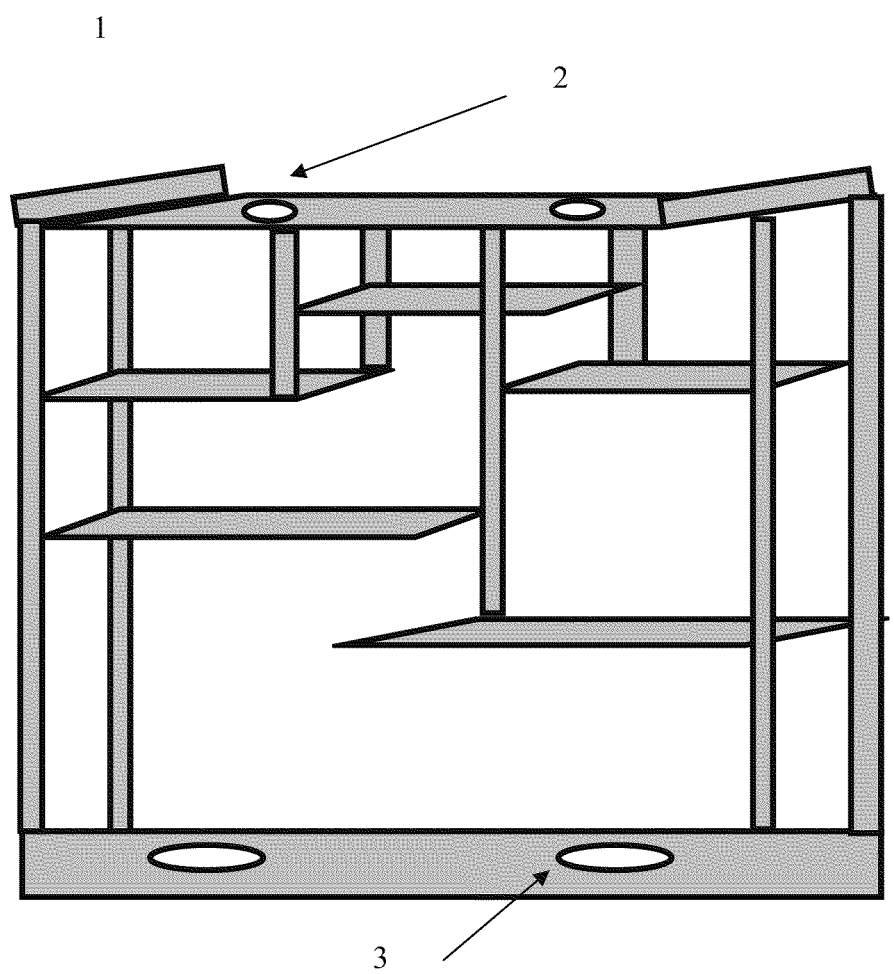
FIGS. 9A-B illustrate two different multi-container support structure designs which incorporate temperature control equipment.

FIG. 9A illustrates one embodiment of the invention, a side view of a device support structure (1) which is fabricated from a wood composite in a traditional Asian design for displaying multiple objects. The support structure contains a cut-outs or holes (2 and 3) to improve heat transfer. Heating plates (not shown) containing resistive wire are mounted to the underside of support structure (1) using screws (not shown). The heat plates are connected to a power cord (not shown) which includes a hi/lo/off power switch which provides a high temperature setting, a low temperature setting, and an off setting.

FIG. 9B.

Figure 9B:
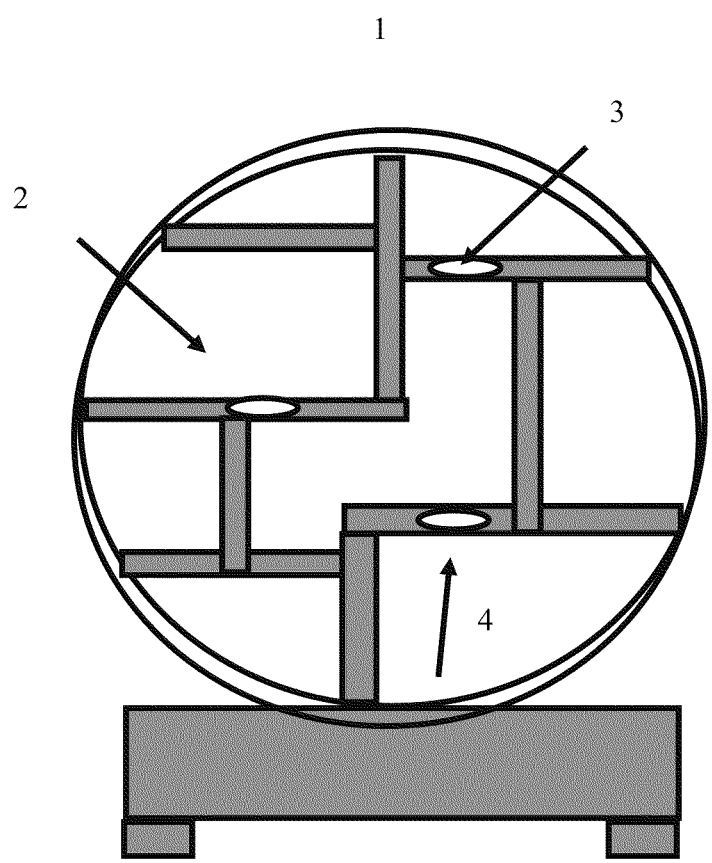

FIG. 9B illustrates one embodiment of the invention, a side view of a device support structure (1) which is fabricated from a wood composite in a traditional Asian design for displaying multiple objects. The support structure contains a cut-outs or holes (2 and 3) to improve heat transfer. Heating plates (not shown) containing resistive wire are mounted to the underside of support structure (1) using screws (not shown). The heat plates are connected to a power cord (not shown) which includes a hi/lo/off power switch which provides a high temperature setting, a low temperature setting, and an off setting.

Specific Use and Preferred Embodiments:

Exemplary embodiments of the invention are described in the following Examples. These Examples while illustrative are not meant to be fully descriptive of the utility and functionality of devices and methods of the invention. Devices can be scaled and sized to meet the requirements of many different specific applications. Those experienced in the art will understand the size of devices and electronic temperature control equipment for each application. Likewise, those experienced in the art will understand the inherent compatibilities of the container materials, container support structure materials, and electrical components. Further those experienced in the art will understand the temperature requirements of the living organisms housed in the container.

EXAMPLES

Example 1

The freshwater fish *Betta splendens* or as it is commonly known the Siamese Fighting fish is widely available in the aquarium hobby. It is an excellent fish for beginner hobbyists as well as an aesthetically beautiful species for aquarium aficionados. The fish can breathe air through a specialized organ and prefers calm warm waters. The fish's aggressive nature usually requires that it is kept individually. This species and related inhabit tropical fresh waters with temperatures typically near 80° F. or above.

Unfortunately, while this species is easier to care for, it is often placed in small containers in rooms with ambient temperatures less than 80° F. As a result, the fish is inactive, takes food weakly, and is prone to disease and a short lifespan.

Several male fish were purchased at local retail locations and placed in containers such as that illustrated in FIG. 6. The container was placed on a support as illustrated in FIG. 6. This support was constructed with a 17 watt resistive heating element and electronics which allowed the heating element temperature to be adjusted. The container was filled with water and a fish and a floating plant (Anacharis) placed in the container. The ambient room temperature varied between 65° F. and 72° F. The aquarium temperature was maintained between 80° F. and 85° F. when the container support structure was turned on and placed in the high setting. The fish was observed to be very active. When the container support's heating element was switched off the container temperature returned to ambient temperatures between 65° F. and 72° F. and the fish was observed to be very inactive. Similar results were obtained with device designs illustrated in FIGS. 1-9.

Example 2

A female *Betta splendens* fish was purchased at a local retail location and placed in a container such as that illustrated in FIG. 6. The container was placed on a container support as illustrated in FIG. 6. This container support was constructed with a 17 watt resistive heating element and electronics which allowed the heating element temperature to be adjusted. The container was filled with water and the fish and a floating plant placed in the container. The ambient temperature varied between 65° F. and 72° F. The aquarium temperature was maintained between 80° F. and 85° F. when the container support was turned on and the fish was observed to be active. When the container support's heating element was switched off the container temperature returned to ambient temperatures between 65° F. and 72° F. and the fish was observed to be very inactive. Similar results were obtained with device designs illustrated in FIGS. 1-9.

Example 3

Mating between male and female *Betta* fish often only occurs when temperatures are near 80° F. Experts in this field recommend a temperature between 80° F. and 85° F. to promote mating.

Male and female *Betta splendens* fish were purchased at a local retail location and placed in a container such as that illustrated in FIG. 6. The container was placed on a support as illustrated in FIG. 6. This support was constructed with a 17 watt resistive heating element and electronics which allowed the heating element temperature to be adjusted. The container was filled with water and the fish and a floating plant placed in the container. The ambient room temperature varied between 65° F. and 72° F. The aquarium temperature was maintained between 80° F. and 85° F. when the container support was turned on and the fish were observed to be active.

The *Betta splendens* fish were placed together by removing the female from her container and placing her into the container with the male. After some time the fish mated, and the male maintained the fertilized eggs in a bubble nest. After 36 hours the eggs hatched and swimming fry were observed. The *Betta* fry are sensitive to temperature in the first several weeks. Approximately 300 fry were maintained initially in one container but divided between a total of 12 containers of the invention during the first six weeks of development. During this time the ambient room temperature varied between 65° F. and 75° F., however the aquaria fabricated with the method of the invention only varied between 80° F. and 82° F. All three hundred fry were raised to the immediate stage and then distributed to those interested as pets.

The invention claimed is:

1. A device for maintaining living organisms in a temperature controlled environment comprising:
    one or more aquarium or terrarium containers for housing said living organisms, wherein said aquarium or terrarium container consists of glass, plastics, or a combination thereof; and
    a container support structure, comprising a hole or cut-out in a top surface of the container support structure above which each aquarium or terrarium container is separably attached such that each aquarium or terrarium can be separated from the container support structure, and below which a flat planar integrated temperature control element is mounted in intimate contact with the container support structure, wherein the flat planar integrated temperature control element is pressure fit into a section of the container support structure below the hole or cut-out in the top surface of the container support structure;
    wherein said temperature control element has less than 35 watts of power and is not in direct contact with said one or more aquarium or terrarium containers; and
    wherein said temperature control element is separated from the bottom of said one or more aquarium or terrarium containers by a volume of air contained within the container support structure that transfers heat between said temperature control element and said one or more aquarium or terrarium containers.

2. The device of claim 1, wherein said device incorporates an interlocking mechanism for attaching said one or more aquarium or terrarium containers and said container support structure.

3. The device of claim 1, wherein said flat planar integrated temperature control element comprises a resistive wire heating element.

4. The device of claim 3, wherein said resistive wire heating element comprises nichrome wire, copper nickel alloy wire, tungsten wire, molybdenum wire, or combinations thereof.

5. The device of claim 3, wherein said flat planar integrated temperature control element is incorporated into the support structure by metal screws, plastic screws, metal nuts and bolts, plastic nuts and bolts, adhesives, pressurization, clips, fasteners, or combinations thereof.

6. The device of claim 1, wherein said container is in the shape of a bowl, a cylinder, a rectangle, a square, a vase, a hexagon, or an octagon.

7. The device of claim 1, wherein said container is in the shape of a vase with dimensions 4 ×8 ×13 inches.

8. The device of claim 1, wherein said container has a volume of less than 5 gallons.

9. The device of claim 1, wherein said container support structure is in the form of a design selected from a group consisting of, lamp bases, vase stands, figurine stands, artifact stands, plant stands, and aquarium stands.

10. The device of claim 1, wherein said container support structure is constructed from wood, metal, wood composites, wood laminates, MDF, compressed wood, wood-resin composites, metal composites, stone, plastic, composite plastics, or combinations thereof.

11. The device of claim 1, wherein said container has a removable lid prepared from straw, wood, bamboo, plastic, or combinations thereof.

12. The device of claim 1, wherein said container support structure contains air and heat control elements selected from the group including holes, slots, and heat conductors, or combinations thereof.

13. The device of claim 1 further comprising an integrated light source.

14. The device of claim 1 further comprising a removable power cord.

15. The device of claim 1, wherein the container support structure further comprises thermoelectric coolers, peltier coolers, thermoelectric heating elements, thermostats, switches, diode power regulators, indicator lights, on/off switches, lighting components, fans, power cords, or compressor based cooling elements.

16. The device of claim 1, wherein the flat planar integrated temperature control element is attached to a bottom surface of the container support structure.

17. The device of claim 1, wherein the flat planar integrated temperature control element comprises a metal alloy wire between two metal plates.

18. The device of claim 1, wherein said container support structure consists of wood composites, wood laminates, MDF, compressed wood, wood-resin composites, or combinations thereof.

19. A method for maintaining living organisms in a temperature controlled environment comprising:
    placing said living organisms in a device; and
    adjusting the temperature of the device to an optimum temperature for said living organisms;
    wherein the device comprises one or more aquarium or terrarium containers for housing said living organisms and a container support structure on which said one or more containers rests;
    wherein said aquarium or terrarium container consists of glass, plastics, or a combination thereof;
    wherein said container support structure comprises a hole or cut-out in a top surface of the container support structure for each aquarium or terrarium container to sit above and below which a flat planar integrated temperature control element is mounted in intimate contact with the container support structure, wherein the flat planar integrated temperature control element is pressure fit into a section of the container support structure below the hole or cut-out in the top surface of the container support structure;
    wherein each aquarium or terrarium container can be separated from the container support structure;

wherein said temperature control element consists of a heating element attached to a power cord consisting of an on-off switch and a diode providing one or more temperature settings; and wherein said temperature control element is not in direct contact with said container; and wherein said temperature control element is separated from the bottom of said container by a volume of air contained within the container support structure that transfers heat between said temperature control element and said container.

20. The method of claim 19, wherein said container support structure consists of wood composites, wood laminates, MDF, compressed wood, wood-resin composites, or combinations thereof.

* * * * *